(12) United States Patent
Singleton

(10) Patent No.: US 6,508,643 B2
(45) Date of Patent: Jan. 21, 2003

(54) ROTARY BLOW MOLDING MACHINE

(75) Inventor: Brian M. Singleton, Saline, MI (US)

(73) Assignee: Ann Arbor Machine Company, Chelsea, MI (US)

( * ) Notice: Subject to any disclaimer, the term of this patent is extended or adjusted under 35 U.S.C. 154(b) by 21 days.

(21) Appl. No.: 09/754,478

(22) Filed: Jan. 4, 2001

(65) Prior Publication Data

US 2002/0086083 A1 Jul. 4, 2002

(51) Int. Cl.[7] ............................................. B29C 49/58
(52) U.S. Cl. ..................................................... 425/535
(58) Field of Search .............................. 425/532, 534, 425/535, 540, 541; 264/543

(56) References Cited

U.S. PATENT DOCUMENTS

| | | | |
|---|---|---|---|
| 3,599,280 A | 8/1971 | Rosenkranz et al. | 425/192 R |
| 3,652,751 A * | 3/1972 | Criss et al. | 425/532 |
| 3,767,747 A * | 10/1973 | Uhlig | 425/532 |
| 3,778,213 A * | 12/1973 | Di Settembrini | 425/532 |
| 3,936,521 A | 2/1976 | Pollock et al. | 264/334 |
| 3,963,404 A * | 6/1976 | Pollock et al. | 425/540 |
| 4,073,847 A * | 2/1978 | Mehnert | 425/534 |
| 4,299,549 A | 11/1981 | Suzuki et al. | 425/540 |
| 4,437,825 A * | 3/1984 | Harry et al. | 425/534 |
| 4,470,796 A | 9/1984 | Stroup et al. | 425/526 |
| 4,698,012 A | 10/1987 | Shelby et al. | 425/526 |
| 4,801,260 A * | 1/1989 | Oles et al. | 425/540 |
| 4,871,492 A * | 10/1989 | Spoetzl | 425/525 |
| 4,929,410 A * | 5/1990 | Meyer et al. | 425/525 |
| 5,509,796 A | 4/1996 | Di Settembrini | 425/526 |
| 5,591,462 A | 1/1997 | Darling et al. | 425/173 |
| 5,783,232 A | 7/1998 | Roos et al. | 425/526 |
| 5,863,571 A | 1/1999 | Santais et al. | 425/526 |
| 5,948,346 A | 9/1999 | Mills et al. | 264/543 |

FOREIGN PATENT DOCUMENTS

DE 29817897 U1 * 6/1999 ........... B29C/49/36

* cited by examiner

*Primary Examiner*—Robert Davis
(74) *Attorney, Agent, or Firm*—Olson & Hierl, Ltd.

(57) ABSTRACT

A multi-station rotary blow molding machine suitable for molding hollow articles from a thermoplastic parison is described. Plural, indexable dials present blow mold assemblies for parison insertion at a common, shared parison insertion station. The parisons can be extruded parisons or injection molded preforms.

9 Claims, 4 Drawing Sheets

ROTARY BLOW MOLDING MACHINE

FIELD OF INVENTION

This invention relates to machines and sub-assemblies thereof for manufacturing hollow articles from thermoplastic materials by blow molding.

BACKGROUND OF INVENTION

Blow molding is a fabrication method for hollow thermoplastic shapes.

Two general classes of plastic products are made in this manner packaging products and technical parts. Packaging products include such items as bottles, jars, jugs, cans, and the like containers. Technical parts include automotive components such as bumpers, fuel tanks, functional fluid containers, ducting, and the like.

The blow molding process can be of two general types: extrusion blow molding and injection blow molding. In extrusion blow molding, a parison is lowered between mold halves from an extruder. The mold halves then close around the parison, and the parison is then expanded against a mold cavity by introduction of a blowing gas, usually air. In injection molding, a thermoplastic material is first injection molded into a preform parison which is then transferred to a blow mold and expanded in the same manner as in an extrusion blow molding process.

In continuous extrusion, a molten parison is produced from an extruder die without interruption, and a segment thereof is severed and positioned into a mold. The molds can be moved from station to station on rotating vertical wheels, on a rotating horizontal table, or with a reciprocating action. When the parison is extruded, the mold is moved under the extruder die head to receive the parison segment and then is moved to a blowing station.

The positioning of the parison relative to the mold in a rotary system is relatively difficult, thus most of the current blow molding machines utilize the reciprocating mold concept according to which the molds are shuttled back and forth from station to station. A major drawback of the reciprocating mold concept, however, is a limitation on production rate.

In intermittent extrusion, the molds are mounted to a common platen and the parisons are extruded by either a reciprocating screw extruder or by a ram accumulator which holds in readiness a volume of molten plastic material needed to make the next part or parts.

In injection blow molding the parison in first injection molded to a predetermined shape and then transferred to a blow mold to be blown into a finished product.

In all cases, however, the parison has to be transported from station to station to complete the fabrication of a hollow plastic article.

In view of the relatively large commercial demand for various types of plastic articles, it would be desirable to have a blow molding machine of relatively high capacity that can produce high quality articles at a relatively low cost. The present invention satisfies this desire.

SUMMARY OF THE INVENTION

The present invention provides a blow molding machine capable of relatively high production rates at relatively low cost.

The foregoing advantages are achieved by a multi-station blow molding machine in which a single parison insertion station is shared by more than one rotary mold array. In particular, the present multi-station blow molding machine is suitable for fabrication of hollow articles from parisons or tubular thermoplastic blanks and includes a base and a pair of rotatable, indexable dials each of which carries a pair of opposed blowing mold clamp assemblies that are indexable to a common parison insertion station but to separate blowing and take-out stations for each indexable dial. A drive is provided for each indexable dial, and the indexable dials can be driven independently or synchronously, as desired, as long as interference between the dials is avoided. The indexable dials are supported on a base for rotation about spaced, substantially parallel vertical axes.

A blowing mandrel assembly mounted to a frame is provided at each blowing station for blow molding hollow thermoplastic articles. A blowing mandrel assembly particularly well suited for use with the present rotary multi-station blow molding machine has a housing that contains an array of reciprocatable blowing mandrels. The number of blowing mandrels provided in any given instance is dependent upon the number of cavities in each mold. A spring-actuated, apertured bushing plate is part of the housing and serves to guide the blowing mandrels from a rest position to a blowing position when a parison-bearing mold is presented at a blowing station.

The housing is defined by the apertured bushing plate, a pair of upstanding guide bars with an end portion thereof affixed to the bushing plate, an apertured mounting plate which slidably receives the guide bars, and an apertured lift plate which is affixed to the guide bars at a mid-portion thereof and serves to lift the bushing plate together with the blowing mandrels as the blowing mandrels are elevated from a blowing position to a rest position. The lift plate is provided with at least one aperture sized to receive a blowing mandrel.

Plural blowing mandrels are slidably mounted to the housing and extend into aligned apertures defined by the bushing plate and by the mounting plate. A biasing coil spring is situated around each guide bar and is positioned between the lift plate and the mounting plate. When the blowing mandrel assembly is in the rest position, the biasing coil spring is in a compressed state. When compression is released, the biasing coil spring exerts a downwardly driving force against the lift plate and urges the lift plate, together with the bushing plate, downwardly toward a mold assembly positioned thereunder. Distal end portions of the blowing mandrels extend through the bushing plate when in the blowing position. A spacer stop, which can be a rigid tubular sleeve or the like, is provided on at least one blowing mandrel that is slidably received in an aperture defined by the lift plate and serves to limit the travel of the lift plate in an upwardly direction when the blowing mandrels are raised to the rest position.

Each blowing mandrel is provided with an actuator that reciprocates the blowing mandrel between a relatively lower blowing position and a relatively higher rest position. The actuator is connected to a proximal end portion of the blowing mandrel through the mounting plate and is affixed to the mounting plate of the housing. The actuator can be a hydraulic cylinder, a pneumatic cylinder, a solenoid device, or the like, as desired.

DESCRIPTION OF PREFERRED EMBODIMENTS

Figure 1:
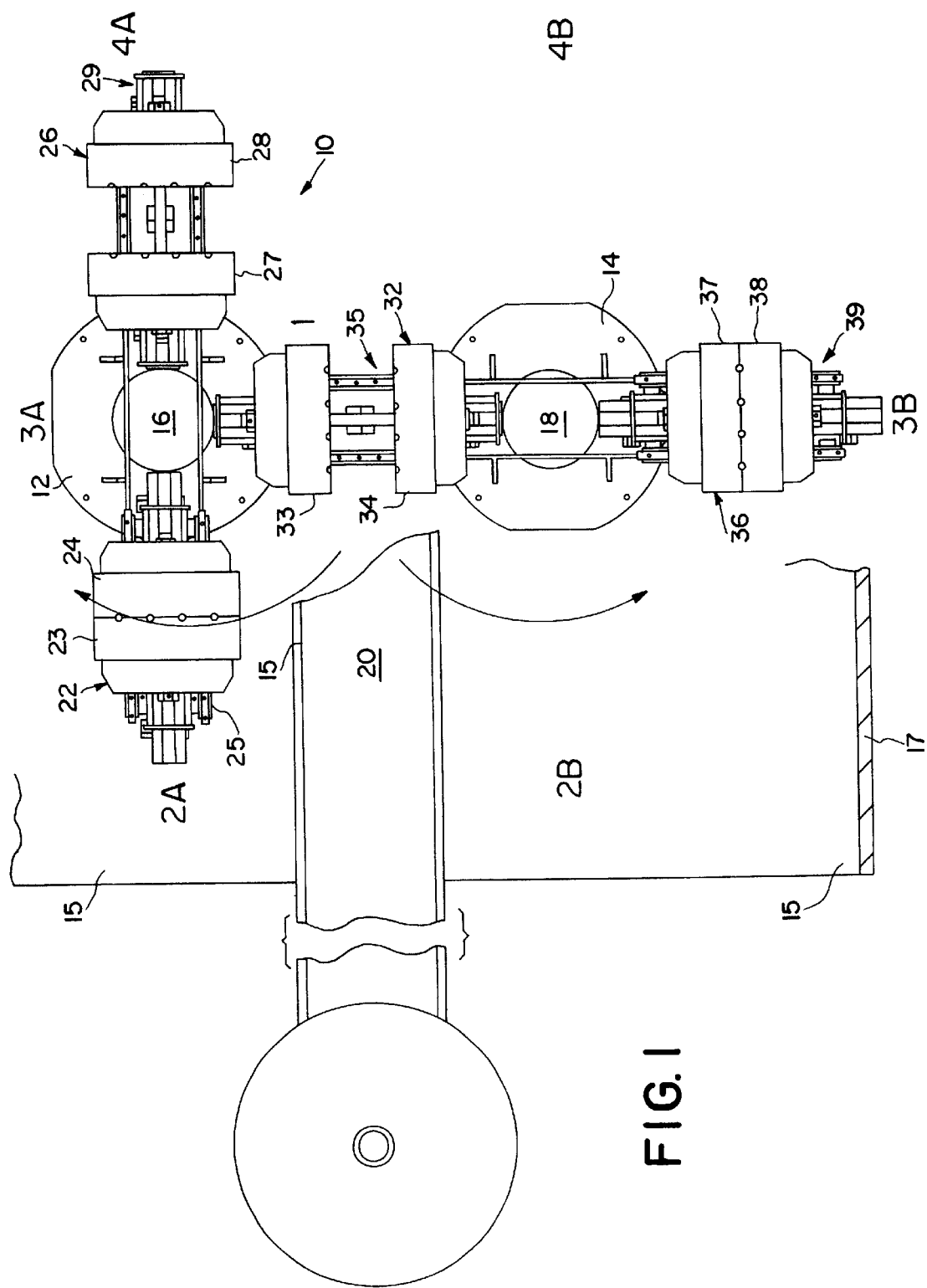
FIG. 1 is a partial plan view of a blow molding machine that embodies the present invention. Shown in bold single digit numerals in FIG. 1 are the several work stations for paired indexing dials that carry blow mold assemblies. Station 1 is shared by the paired indexing dials.

The invention disclosed herein is, of course, susceptible to embodiment in many different forms. Shown in the drawings and described in detail hereinbelow are certain preferred embodiments of the present invention. The present disclosure, however, is an exemplification of the principles and features of the invention, but does not limit the invention to the illustrated embodiments.

For ease of description, the rotary multi-station blow molding machine and the blowing mandrel array of this invention will be described as they exist in a normal operating position, and terms such as upper, lower, top, bottom, vertical, horizontal, etc. will be used with reference to that position.

Referring to FIG. 1, rotary multi-station blowing machine 10 includes paired indexable dials 12 and 14 that are supported on base 15 and mounted for rotation about spaced, substantially parallel vertical axes. Dials 12 and 14 are provided with respective drives 16 and 18. As shown in FIG. 1, drive 16 indexes dial 12 clockwise, and drive 18 indexes dial 14 counterclockwise, both sequentially through respective work stations 1, 2A, 3A and 4A for dial 12 and work stations 1, 2B, 3B and 4B for dial 14. Work station 1, the parison insertion station, is shared by both dials. Drives 16 and 18 preferably are synchronously driven so as to minimize the likelihood of interference between dials 12 and 14, but can be driven in any convenient manner.

The parison to be molded is supplied by continuous extruder 20, also mounted to base 15. Instead of continuous extrusion, the parison to be molded can also be supplied to the parison insertion station as a preform which can then be inserted into the mold at Station 1 in any convenient manner.

Dial 12 is provided with diametrically opposed mold assemblies 22 and 26. Mold assembly 22 includes complementary mold halves 23 and 24, as well as mold clamp assembly 25. Likewise, mold assembly 26 includes complementary mold halves 27 and 28 as well as mold clamp assembly 29. Dial 14 is provided with diametrically opposed mold assemblies 32 and 36. Mold assembly 32 includes complementary mold halves 33 and 34, as well as mold clamp assembly 35. In the same manner, mold assembly 36 includes complementary mold halves 37 and 38, as well as mold clamp assembly 39. The molds, and thus the respective mold halves on each of the dials, can be the same or different, depending upon production requirements.

Mold halves 34 and 35 on dial 14 at Station 1 are shown in an open position, ready to receive an extruded parison, whereas mold halves 37 and 38 at Station 3B are shown in closed position. On dial 12, mold halves 23 and 24 at Station 2A, the blowing station, are in a closed position, and mold halves 27 and 28 at Station 4A, the take-out station, are shown in an open position.

The present rotary multi-station design provides substantial manufacturing flexibility. For example, post-blow cooling for the molded article can be effected while the article is still in the mold by providing a shot of cold fluid (liquid or gas) at Stations 3A and 3B, or even at Stations 4A and 4B just prior to take-out without materially affecting the overall rate of production.

A hydraulic cylinder arrangement is utilized to open and close the mold halves carried in the respective mold clamp assemblies 25 and 29 on dial 12 and mold clamp assemblies 35 and 39 for dial 14. Hydraulic cylinder 43 (FIG. 2) mounted to base 15 at station 1 is used to clamp mold assembly 32 closed and hydraulic cylinder 49 (FIG. 3) mounted to base 15 at station 4A is used to unclamp mold assembly 26.

The linkages associated with each mold clamp assembly include a toggle which is secured to each mold clamp assembly and has a central pivot which is attached to the mold clamp frame. A pivotable arm is located between each mold clamp and its associated toggle. The toggle is pivotally positionable about its central pivot in one of two orientations, a first orientation at which a pivot connecting the toggle to the arm is raised and the mold clamps are opened away from one another, and a second orientation in which another pivot is raised and the mold clamps are closed against one another. The pivot orientations are over-the-center orientations such that the center of the pivot connecting the arm and the toggle is passed through a line between the center of the pivot of the arm and the central pivot of the toggle as the toggle is pivoted between the open and closed orientations to provide an over-the-center latching mechanism for each of the mold clamp assemblies. Preferably the over-the-center latching mechanism is cylinder actuatable, i.e., actuatable by a hydraulic cylinder or a pneumatic cylinder. If desired, an electromechanical actuator such as a solenoid can be utilized to actuate the latching mechanism.

Figure 2:
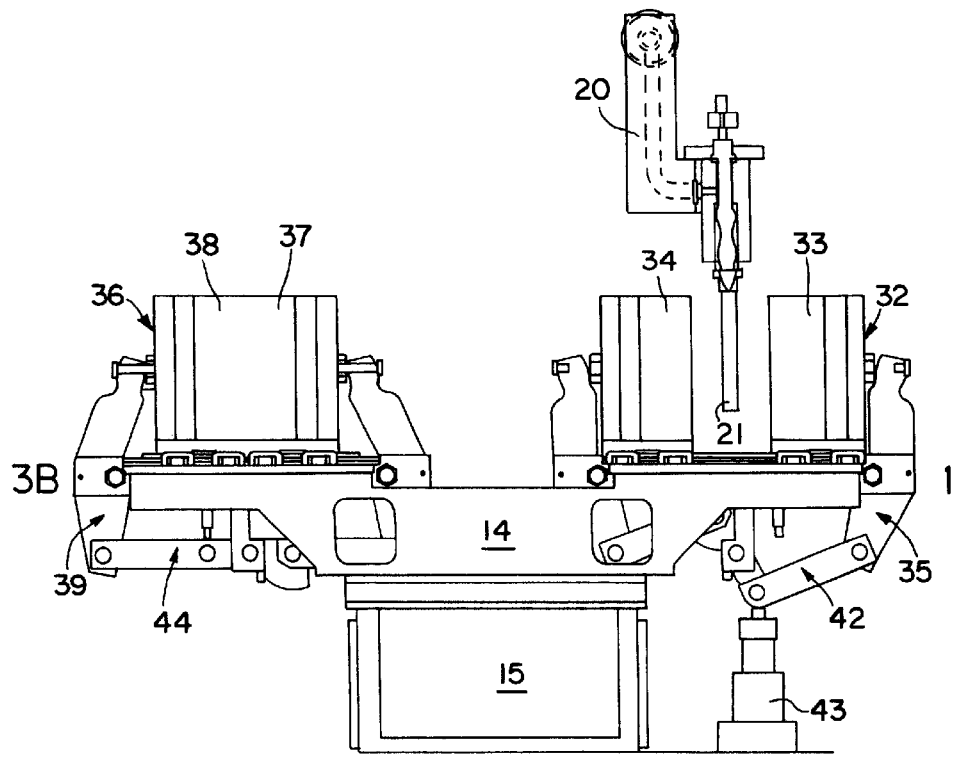
FIG. 2 is a partial side elevation of an indexing dial with mold assemblies at Stations 1 and 3B, and illustrating parison insertion at shared Station 1.

FIG. 2 shows mold assembly 32 on dial 14 at common Station 1 where parison 21 extruded from continuous extruder 20 is positioned between complementary mold halves 33 and 34. Mold cavity defined by mold halves 33 and 34 is shown in phantom. At the same time mold 36, also on dial 14, is indexed to Station 3B, which can be an idle work station or a work station at which any desired secondary operation, e.g., cooling of a blow molded article, can be performed.

Toggle 42 for mold clamp assembly 35 is shown in the mold-open position, while toggle 44 for mold clamp assembly 39 is shown in the mold-closed position. Hydraulic cylinder 43 actuates toggle 42 from a mold-open to a mold-closed position when mold assembly 32 with parison 21 on dial 14 is at Station 2B.

Figure 3:
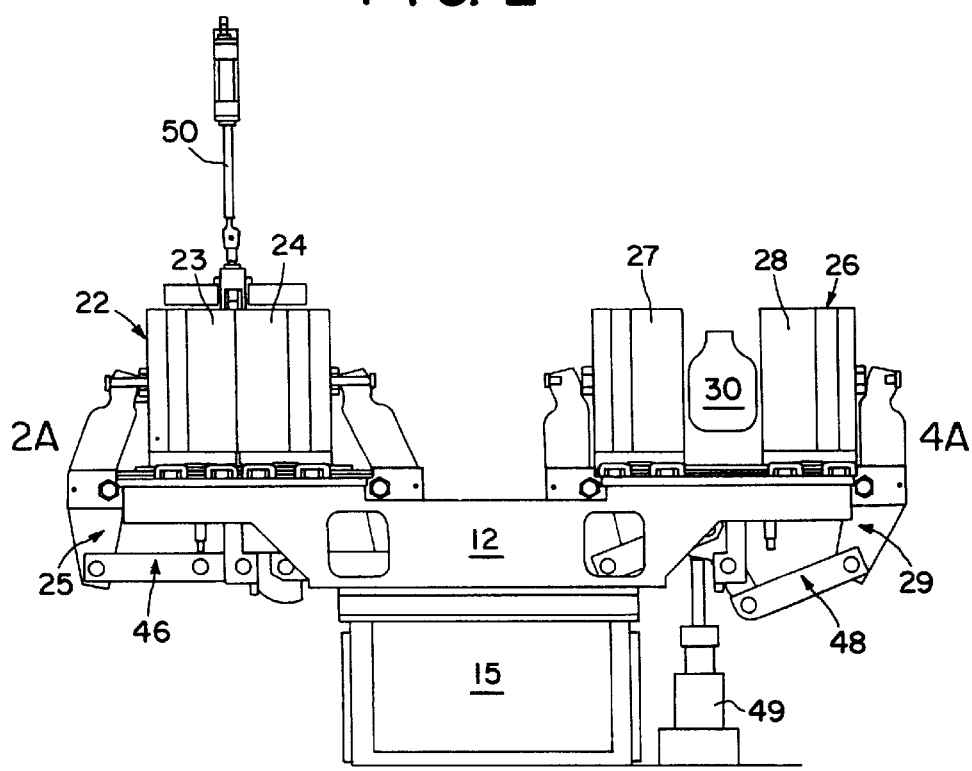
FIG. 3 is a partial side elevation of an indexing dial with mold assemblies at Stations 2A and 4A, and illustrating dial position during a blowing operation at Station 2A and a finished article takeout at Station 4A.

FIG. 3 shows mold assembly 22 on dial 12 at Station 2A where a parison enveloped by mold halves 23 and 24 is being blow molded by a molding gas introduced via blowing mandrel 50. At the same time, opposite mold assembly 26 on dial 12 is at Station 4A, the take-out station, and in an open position so that molded container 30 can be removed therefrom.

Toggle 46 for mold clamp assembly 22 is shown in the mold-closed position, while toggle 48 for mold clamp assembly 26 is in the mold-open position. Hydraulic cylinder 49 actuates toggle 48 from a mold-closed position to a mold-open position when mold assembly 22 arrives at Station 4A. Mold assembly 26, shown at Station 4A, remains open as it is indexed to the shared Station 1 to receive another parison for molding.

Figure 4:
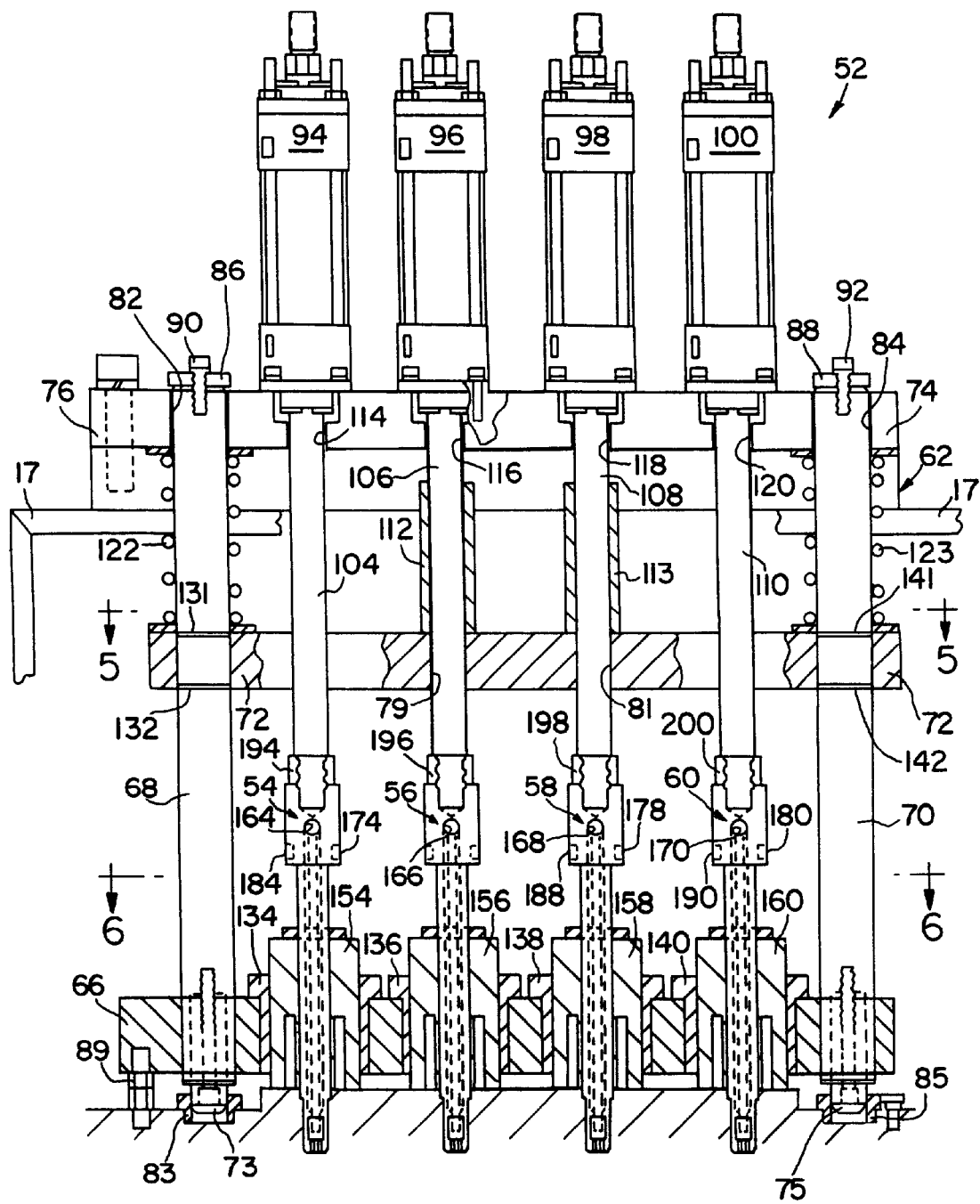
FIG. 4 is a partial side elevation, rolled out to show guide bar details and partly in section, illustrating a preferred blowing mandrel assembly for use with the present blow molding machine.

A blowing mandrel assembly eminently well suited for use with the hereinabove described rotary multi-station blow molding machine is depicted in FIG. 4. Blowing mandrel assembly 52 is constituted by an array of blowing mandrels 54, 56, 58 and 60 mounted to a common housing 62 which, in turn is supported by a frame 17 attached to base 15 (FIG. 1).

Housing 62 includes apertured bushing plate 66, guide bars 68 and 70, apertured lift plate 72, and apertured mounting plate 74. Tapping plate 76 is attached to apertured mounting plate 74 for added rigidity, and also forms part of a frame that supports blowing mandrel assembly 52 in place at a blowing station, such as Stations 2A and 2B shown in FIG. 1. Guide bars 68 and 70 are shown in FIG. 4 in a rolled out position from their location in housing 62 so as to depict more detail.

Lower end portions of guide bars 68 and 70 are fixed into bushing plate 66, and optionally are provided with register pins, such as pins 73 and 75, that project outwardly and downwardly beyond bushing plate 66 for engagement with complementary sockets 83 and 85 of a blow mold assembly positioned at Stations 2A or 2B during a blowing cycle. Register pins 73 and 75 coact with corresponding sockets 83 and 85 to facilitate proper alignment of the individual blowing mandrels in the blowing mandrel assembly with corresponding mold cavities in the mold assembly that is presented by an index dial at a blowing station.

Figure 6:
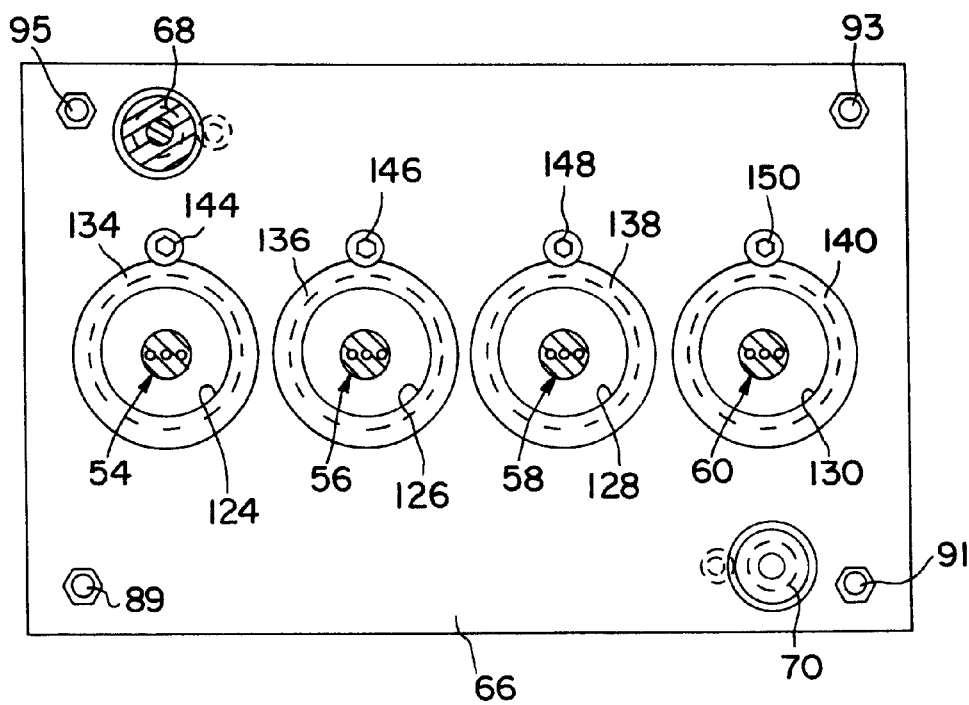
FIG. 6 is a plan view, partly in section, taken along plane 6—6 in FIG. 4.

If desired, bushing plate 66 can be provided with plural rest buttons, such as rest buttons 89, 91, 93 and 95 shown in FIG. 6. At least three, preferably four, such rest buttons are provided on a bushing plate.

Figure 5:
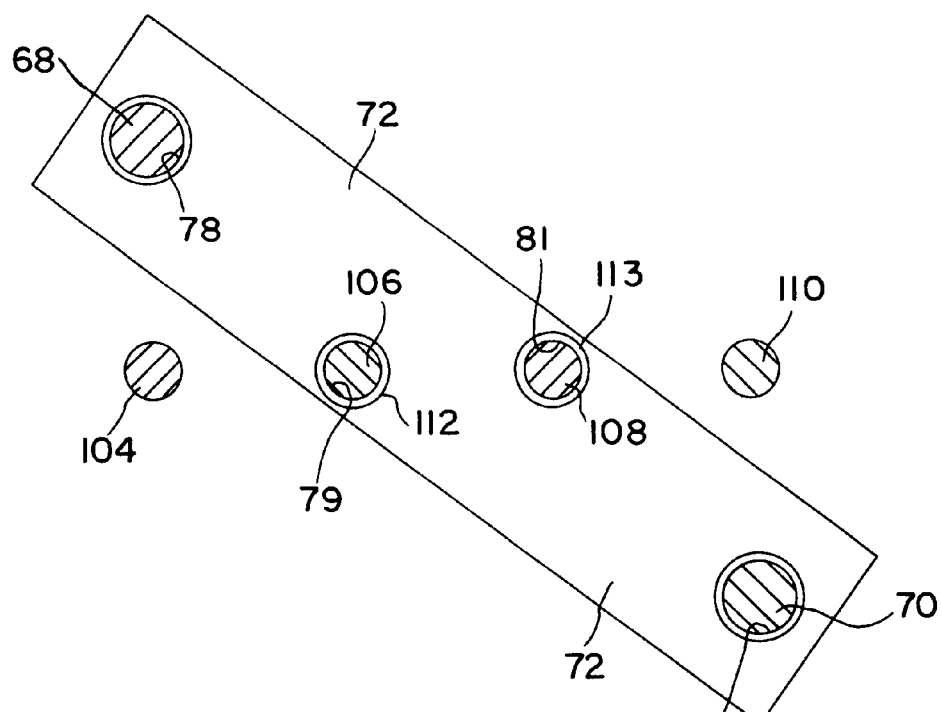
FIG. 5 is a plan view, partly in section, taken along plane 5—5 in FIG. 4.

Guide bars 68 and 70 also pass through lift plate apertures 78 and 80 (FIG. 5). Guide bar 68 is situated behind blowing mandrel 54, and guide bar 70 is situated in front of blowing mandrel 60. Lift plate 72 is secured to guide bars 68 and 70 at a midportion thereof by upper retaining ring 131 and lower retaining ring 132 for guide bar 68, and by upper retaining ring 141 and lower retaining ring 142 for guide bar 70. End portions of guide bars 68 and 70 extend into apertures 82 and 84 in mounting plate 74. Washers 86 and 88, together with respective screws 90 and 92, retain mounting plate 74 on guide bars 68 and 70.

Actuators 94, 96, 98 and 100 are mounted atop of apertured mounting plate 74, and are connected to respective blowing mandrels 54, 56, 58 and 60 by connecting rods 104, 106, 108 and 110 that extend through apertures 114, 116, 118 and 120 in mounting plate 74. These actuators can be hydraulic cylinders, pneumatic cylinders, solenoid devices, or the like. Hydraulic cylinders are the preferred actuators, however.

Connecting rods 106 and 108 of respective blowing mandrels 56 and 58 also extend through lift plate apertures 79 and 81, and are provided with spacer stops, such as rigid sleeves 112 and 113, in the region between lift plate 72 and mounting plate 74. Body portions 196 and 198 of blowing mandrels 56 and 58 are larger in diameter than lift plate apertures 79 and 81, and are configured to abut lift plate 72 as they are raised to their respective rest positions.

Biasing coil springs 122 and 123 are provided around guide bars 68 and 70, respectively, and are situated between lift plate 72 and mounting plate 74. When in compression, biasing coil springs 122 and 123 abut both lift plate 72 as well as mounting plate 74.

Bushing plate 66 (FIG. 6) is provided with individual apertures 124, 126, 128 and 130, respectively, for blowing mandrels 54, 56, 58 and 60, lined with replaceable bushings 134, 136, 138 and 140 that are held in place with retaining screws 144, 146, 148 and 150.

Returning to FIG. 4, stop collars 154, 156, 158 and 160 of respective blowing mandrels 54, 56, 58 and 60 are slidably received in bushings 124, 126, 128 and 130, and serve to limit the penetration depth of the distal end of the blowing mandrels into the mold assembly during the blowing operation.

Blowing gas ports 164, 166, 168 and 170 are provided in the respective body portions of blowing mandrels 54, 56, 58 and 60, as well as cooling medium inlet ports 174, 176, 178 and 180, and cooling medium outlet ports 184, 186, 188 and 190.

The blowing mandrels of blowing mandrel assembly 52 are shown in the extended, blowing position. Upon completion of the blowing operation, actuators 94, 96, 98 and 100 are energized and first retract the distal end portions of mandrels 54, 56, 58 and 60 to clear a mold assembly situated at a molding station below. As retraction of these mandrels is continued to a rest position, body portions 196 and 198 of the respective mandrels abut lift plate 72 and elevate it together with bushing plate 66, while coil springs 122 and 123 are compressed until rigid sleeves 112 and 113 abut the lower surface of mounting plate 74 and then held in a compressed state. When another mold assembly is positioned below blowing mandrel assembly 52 by action of an index dial, or like expedient, actuators 94, 96, 98 and 100 release, and coil springs 122 and 123 urge lift plate 72 downwardly until register pins 73 and 75 are seated in their respective sockets 83 and 85 and rest buttons 89, 91, 93 and 95 abut a pre-selected reference surface on the mold assembly. Thereafter, the actuators extend the distal end portion of each blowing mandrel into the corresponding mold cavity to a blowing position to commence the blowing cycle.

The foregoing description and the drawings are illustrative of the present invention and are not to be taken as limiting. Still other variants and rearrangements of parts within the spirit and scope of the present invention are possible and will readily present themselves to those skilled in the art.

I claim:

1. A blowing mandrel assembly suitable for blow molding hollow thermoplastic articles and comprising:

a housing defined by an apertured bushing plate, a pair of upstanding guide bars having an end portion thereto affixed to the bushing plate, an apertured mounting plate slidably receiving the guide bars, and an apertured lift plate affixed to the guide bars at a mid portion thereof and situated between the bushing plate and the mounting plate;

a biasing coil spring around each guide bar and positioned between the lift plate and the mounting plate;

plural blowing mandrels slidably mounted in the housing, extending into aligned apertures defined by the bushing plate and the mounting plate, and movable between a rest position to a blowing position;

an actuator for each of the blowing mandrels, affixed to the mounting plate and operably connected to a proximal end portion of the blowing mandrel for reciprocating the blowing mandrel; and a spacer stop provided on at least one of said blowing mandrels and positioned between the lift plate and the mounting plate; the blowing mandrel having the spacer stop also being received in an aperture defined in the lift plate and being configured to elevate the lift plate when moved to the rest position.

2. The blowing mandrel assembly in accordance with claim 1 wherein the spacer stop is a rigid sleeve that surrounds the blowing mandrel.

3. The blowing mandrel assembly in accordance with claim 1 wherein the guide bars are provided with a register pin at the end of each guide bar for engagement with a blow mold assembly.

4. The blowing mandrel assembly in accordance with claim 1 wherein the bushing plate is provided with at least three rest buttons for abutment against corresponding abutments on a blow mold assembly.

5. The blowing mandrel assembly in accordance with claim 4 wherein the bushing plate is provided with four rest buttons.

6. The blowing mandrel assembly in accordance with claim 1 wherein each blowing mandrel is provided with a stop collar.

7. The blowing mandrel assembly in accordance with claim 1 wherein the actuator is a hydraulic cylinder.

8. The blowing mandrel assembly in accordance with claim 1 wherein the actuator is a pneumatic cylinder.

9. The blowing mandrel assembly in accordance with claim 1 wherein the actuator is a solenoid device.

* * * * *